(12) United States Patent
Olin et al.

(10) Patent No.: US 6,615,376 B1
(45) Date of Patent: Sep. 2, 2003

(54) METHOD AND SYSTEM FOR EXTERNAL NOTIFICATION AND/OR RESOLUTION OF SOFTWARE ERRORS

(75) Inventors: Gregg R. Olin, Fairport, NY (US); Brian S. Pagano, Farmington, NY (US)

(73) Assignee: X/Net Associates, Inc., Fairport, NY (US)

(*) Notice: Subject to any disclaimer, the term of this patent is extended or adjusted under 35 U.S.C. 154(b) by 0 days.

(21) Appl. No.: 09/443,669

(22) Filed: Nov. 19, 1999

Related U.S. Application Data

(60) Provisional application No. 60/109,049, filed on Nov. 19, 1998.

(51) Int. Cl.[7] .................................................. G06F 11/30
(52) U.S. Cl. ........................... 714/57; 714/48; 714/25
(58) Field of Search ........................... 714/25, 24, 48, 714/49, 47, 57

(56) References Cited

U.S. PATENT DOCUMENTS

| | | | |
|---|---|---|---|
| 3,818,458 A | 6/1974 | Deese | 340/172.5 |
| 4,634,110 A | 1/1987 | Julich et al. | 371/11 |
| 5,287,505 A | 2/1994 | Calvert et al. | 395/600 |
| 5,287,537 A | 2/1994 | Newmark | 395/800 |
| 5,404,499 A | 4/1995 | Nichols | 395/575 |
| 5,432,715 A | 7/1995 | Shigematsu et al. | 364/551.01 |
| 5,544,304 A | 8/1996 | Carlson et al. | 395/182.08 |
| 5,644,735 A | 7/1997 | Luciw et al. | 395/338 |
| 5,678,002 A | 10/1997 | Fawcett et al. | 395/183.01 |
| 5,801,690 A | 9/1998 | Ayoub et al. | 345/329 |

Primary Examiner—Norman M. Wright

(57) ABSTRACT

A method of providing external notification of an error includes detecting an error during an execution of a program command in a first set of commands in a first system, identifying a second system to notify when the error is detected, generating a notification signal based on the detected error, and transmitting the notification signal to the second system. Optionally, the error can be resolved by receiving at least one corrected command from the second system in response to the notification signal and implementing the at least one corrected command into the first set in the first system. A system and a computer readable medium capable of executing the method of the present invention are also disclosed.

22 Claims, 5 Drawing Sheets

METHOD AND SYSTEM FOR EXTERNAL NOTIFICATION AND/OR RESOLUTION OF SOFTWARE ERRORS

The present invention claims priority benefit of U.S. Provisional Patent Application Serial No. 60/109,049, filed Nov. 19, 1998, which is hereby incorporated by reference.

FIELD OF THE INVENTION

The present invention relates to a method and system for providing external notification of a program error to a software or hardware vendor and/or resolving such errors.

BACKGROUND OF THE INVENTION

Regardless of the amount of testing which is performed prior to release of a particular version of software, any number of unforeseen errors may arise during normal use of a software program by consumers and/or end-users. In addition, hardware and/or communication errors or break-downs may also arise. Currently, when confronted with an error of significant proportion, the consumer or end-users must communicate to a technical specialist of the vendor exactly the function being performed when the error arose, the error message displayed by the personal computer (PC) or workstation following development of the error, and any other pertinent information required by a particular vendor (i.e., license number etc.). This communication is typically performed via phone and, quite often, the ability of the technical specialist to diagnose and resolve the error is hampered by inadequate communication of the consumer or end-user. In addition, either the consumer or the vendor may be responsible for significant long-distance telephone expenses.

The present invention is directed to overcoming these deficiencies in the art.

SUMMARY OF THE INVENTION

A method in accordance with one embodiment of the present invention includes: detecting an error during an execution of a program command in a first set of commands in a first system; identifying a second system to notify when the error is detected; generating a notification signal based on the detected error; and transmitting the notification signal to the second system.

A method in accordance with another embodiment of the present invention includes: detecting an error during an execution of a program command in a first set of commands in a first system; identifying a second system to notify when the error is detected; generating a notification signal based on the detected error; transmitting the notification signal to the second system; receiving at least one corrected command from the second system in response to the notification signal; and implementing the at least one corrected command into the first set in the first system.

A method in accordance with another embodiment of the present invention includes: receiving a notification signal from a first system on a second system, the notification signal identifying an error during execution of a program command in a first set of commands on the first system; preparing at least one corrected command on the second system; and transmitting a response signal containing the at least one corrected command from the second system to the first system in response to the notification signal.

A system in accordance with one embodiment of the present invention includes: a detector configured to detect an error during execution of a program command in a first set of commands; a memory having stored therein an address of a second system to be notified following detection of the error; a generator configured to generate a notification signal based on the detected error; and a transmitter configured to transmit the notification signal to the second system.

A computer readable medium in accordance with an embodiment of the present invention has stored thereon instructions which, when executed by a processor, cause the processor to perform the steps of: detecting an error during execution of a program command in a first set of commands in a first system; identifying a second system to notify when the error is detected; generating a notification signal based on the detected error; and transmitting the generated signal to a second system.

With the present invention, the need for consumer or end-user involvement in detecting and diagnosing software errors as well as hardware and/or communication errors or breakdowns is eliminated or, alternatively, kept to a minimum. This is beneficial to both software and hardware vendors, who can receive accurate, objective information in a predictable format, and the end-user or consumer, who is free to continue operating the program to the extent possible. By providing a software program executable on a system for performing a method of the present invention, programming and/or hardware errors can be relayed to and/or repaired by outside sources without the need for consumer or end-user intervention. This provides for much faster and more accurate detection and reporting of error conditions, and eliminates multiple occurrences of an error.

BRIEF DESCRIPTION OF THE DRAWINGS

FIG. 4 is a flowchart of a supplemental sub-routine in a method for providing external notification or resolving an error in accordance with another embodiment of present invention; and.

DETAILED DESCRIPTION OF THE INVENTION

Figure 1:
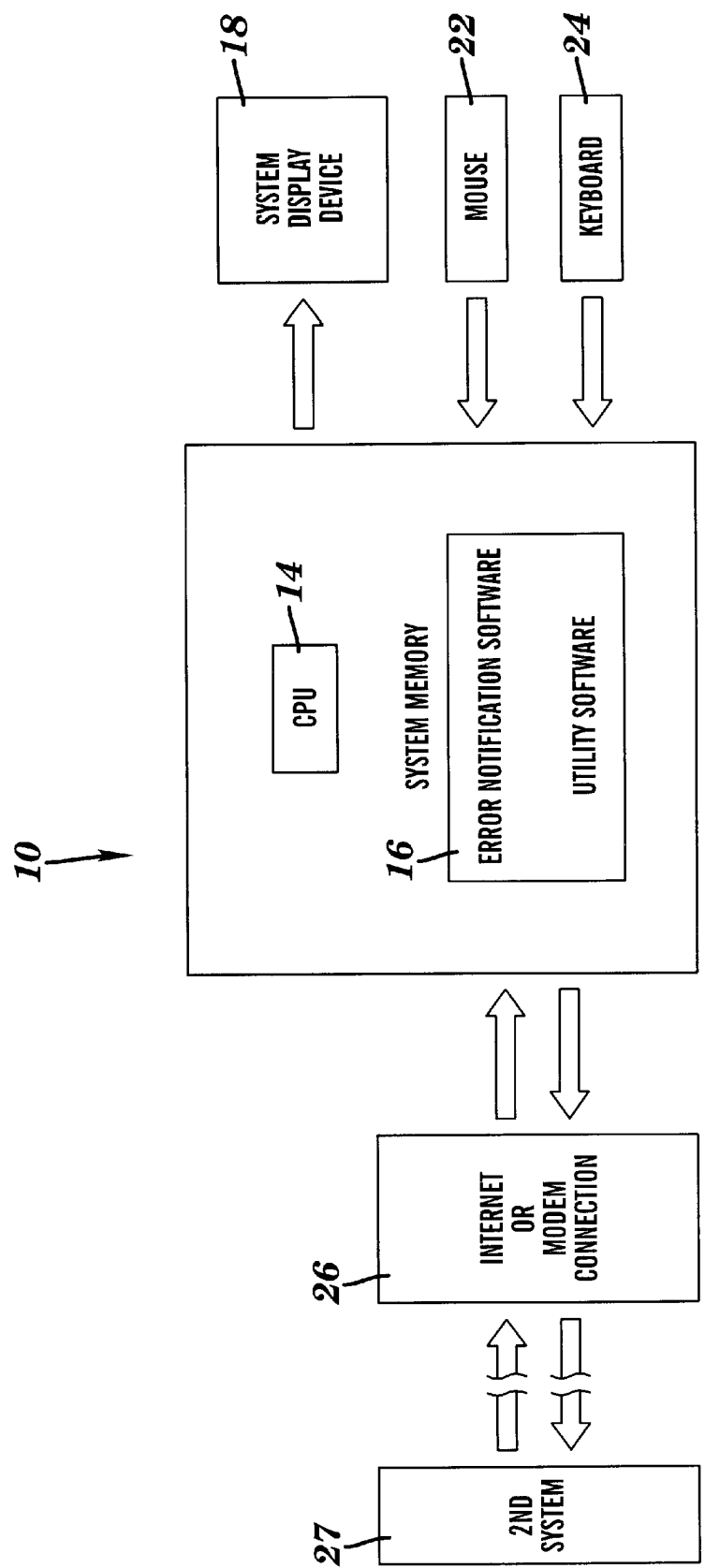
FIG. 1 is a block diagram of a system for external notification and/or resolution of software errors in accordance with one embodiment of the present invention.

A system 10 in accordance with one embodiment of the present invention is shown in FIG. 1. The system 10 includes a processor 14, a memory 16, a display device 18, input devices, such as a mouse 22 and keyboard 24, and an internal bus (not shown) connecting the various components together. The system is coupled to a communication medium 26, such as a modem connected to a phone line, an Internet connection, or a wireless network. Since the components of a computer and how they operate are well known to one of ordinary skill in the art, they will not be discussed here.

Any type of storage device, such as a RAM or ROM, can be used as the memory 16 in the system 10. Additionally, the memory 16 may comprise a disk or CD ROM drive, such as a magnetic or optical read and/or write drive that is coupled to the processor 14 and which can receive, read data from, and/or write data to a portable memory device, such as a floppy disk, hard disk, or CD ROM on which the method for external notification and/or resolution of software errors in accordance with the present invention is programmed. In this particular embodiment, the method for external notification and/or resolution of software errors in accordance with the present invention is stored as an executable program in the memory 16.

The system 10 of the present invention has stored thereon instructions which, when executed by a processor 14, cause the processor 14 to perform the steps of detecting an error in an executed program command of a first set of commands in the system, identifying a second system to notify when the error is detected, generating a notification signal based on the detected error, and transmitting the generated signal to the second system 27. The executed program command is, for example, any command capable of execution by a processor during operation of an application. The system includes a detector configured to detect an error in an executed program command of a first set of commands, a memory 16 having stored therein an address of the second system to be notified following detection of the error, a generator configured to generate the notification signal based on the detected error, and a transmitter configured to transmit the notification signal to the second system. The detector and the generator can independently be any type of processor configured as described above. Alternatively, the detector and generator can be embodied in a single processor configured as described above. The transmitter can be any type of conventional transmitting device such as a modem, wireless, or Internet connection coupled with electronic message capabilities.

The second system 27 is, for example, a networked server operated by a vendor of (or other designated representative for) a software program or hardware which is involved in or responsible for the error. Typically, the second system is separate and distinct from (i.e., external of) the system 10 on which the error notification program resides.

Figure 2:
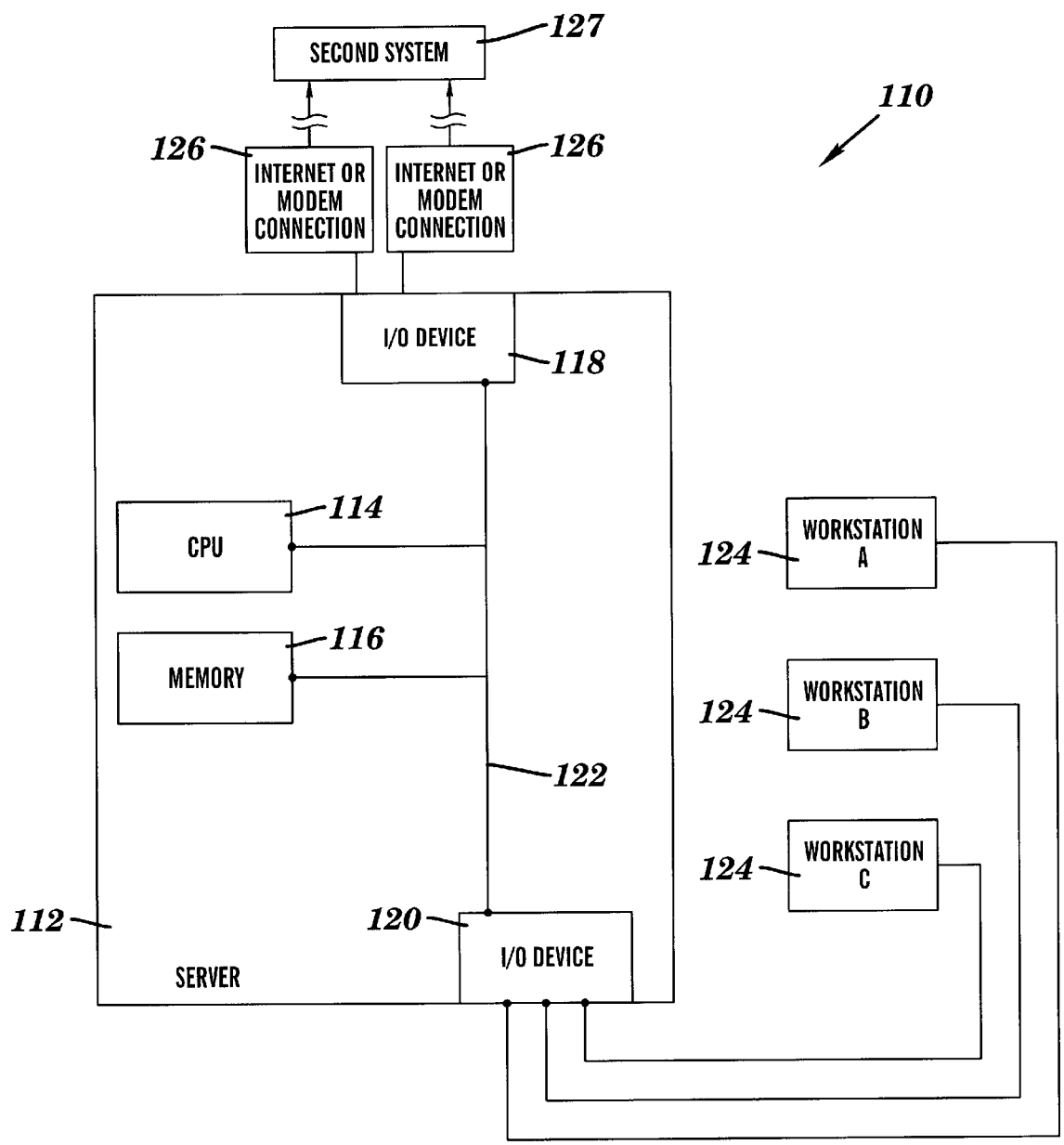
FIG. 2 is a block diagram of another system for external notification and/or resolution of software errors in accordance with another embodiment of the present invention.

A system in accordance with another embodiment of the present invention is shown in FIG. 2. The system 110 includes a server 112, having a processor 114, a memory 116, input/output devices 118 and 120, and an internal bus 122 connecting the various components together. Coupled to input/output device 120 is a plurality of workstations 124. The workstations 124 in this embodiment are also computers which include a processor, a memory device, input/output devices, and an internal bus connecting the components together, although other types of workstations could also be used. Coupled to input/output device 118 is one or more external data links 126, such as a modem connected to a telephone line or an Internet connection coupled to a second system 127. Since the components of a server (as well as individual workstations) and how they operate are well known to one of ordinary skill in the art, they will not be discussed in detail here. The error notification software program of the present invention can be installed into the memory 116 of the system 110 for execution by the processor 114 and/or in memory in the work station 124.

Figure 3:
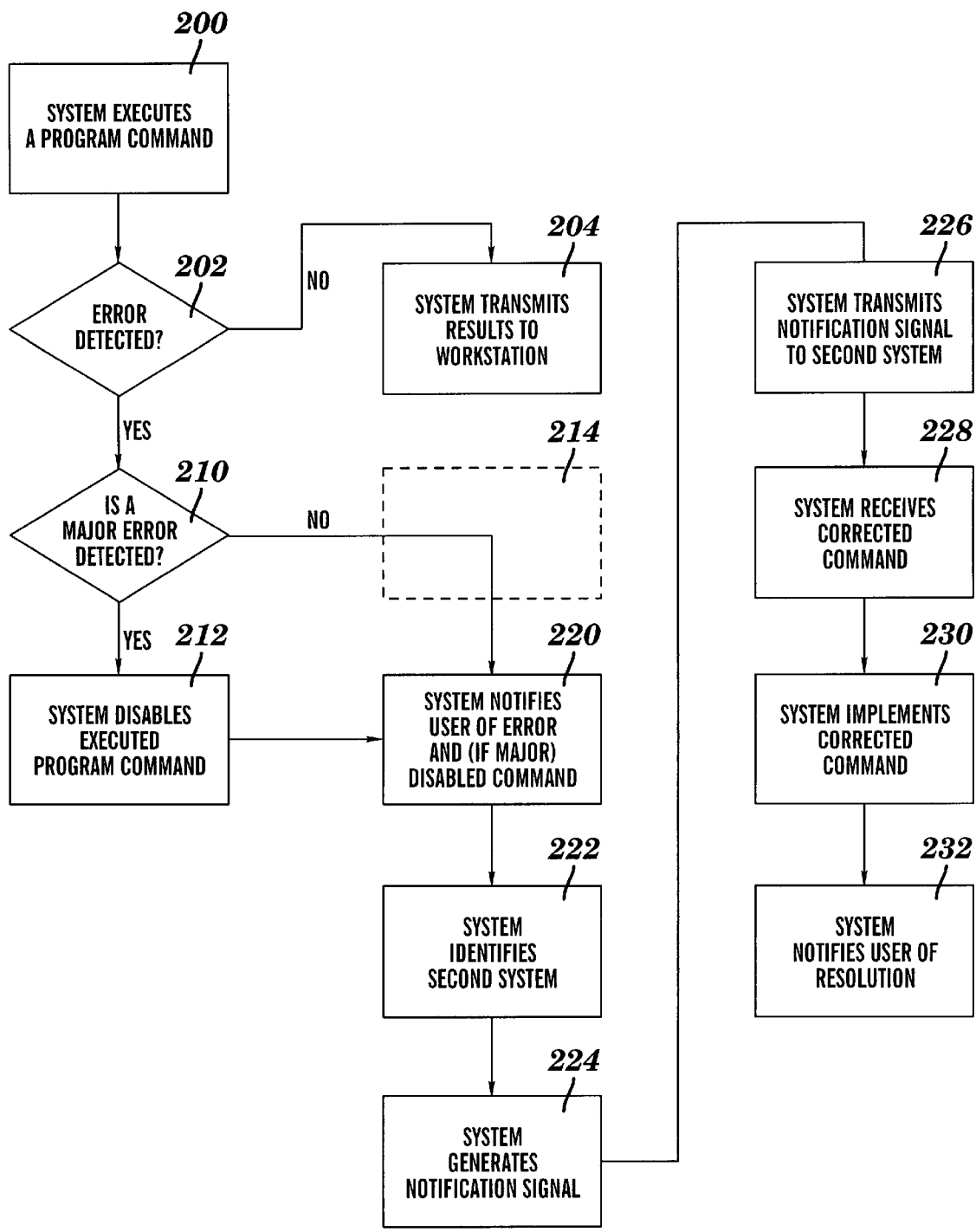
FIG. 3 is a flowchart of a method for providing external notification or resolving an error in accordance with one embodiment of the present invention.

The operation of the method and system 110 for external notification of a software program error in accordance with one embodiment of the present invention will be discussed with reference to FIG. 3. The system 110 executes a method of the present invention as well as one or more applications.

In step 200, the server 112 (i.e., via processor 114) executes a program command of a first set of commands which are stored in memory 116. The first set of commands contains a plurality of executable commands. An error signal is generated in response to an error that occurs during execution of a command. In step 202, the server 112 detects whether an error signal occurred during execution of the program command. If no error signal is detected at step 202, the NO branch is taken to step 204 and the server 112 transmits the results of the executed command to a workstation 124. If an error signal is detected at step 202, the YES branch is taken to step 210 where the server 112 queries whether the error occurring in the executed command constitutes a major error. In this particular embodiment, a major error is one where substantial functionality of the system is lost. For example, the major error can be any error which disrupts operation of an application or hardware/ communication errors or breakdowns which preclude execution of the command(s). A first look up table of major errors is stored for each application being executed by the system. The particular errors listed as major errors in the table can vary as needed or desired for the particular system.

To determine whether the error is, in fact, a major error, the processor 114 will determine whether the error signal is listed in the first look-up table stored in memory 116. If the error signal is not listed in the first look-up table, then the error signal is not indicative of a major error and the NO branch is taken to step 220, where the user is notified that the error occurred. This is achieved by the processor 114 initiating a signal for a particular workstation 124, resulting in a message appearing on that workstation (i.e., on a monitor). If the error signal is listed in the first look-up table, then the error signal is indicative of a major error and the YES branch is taken to step 212, where the processor 114 disables the program command of the first set being executed when the error was detected.

As a result of disabling the program command, all dependent commands are similarly disabled, but all independent commands remain enabled. After disabling the program command at step 212, the server preferably proceeds to step 220 where the user is notified that the error occurred and the command has been disabled. This is achieved by the processor 114 initiating a signal for a particular workstation 124, resulting in a message appearing on that workstation (i.e., on a monitor).

After notifying the user at step 220, the server 112 proceeds at step 222 to identify a second system to notify when the error is detected. To identify the second system 127, processor 114 will match the detected error signal with a particular second system appearing in a second look-up table stored in memory 116. The second look-up table can include any one of a variety of addresses for the second system, such as a telephone number (i.e., for modem connection) or an Internet address (i.e., for electronic mail messages and the like). Having identified the second system and its particular address, the server 112 proceeds to step 224 by generating a notification signal directed to the second system.

The notification signal can include any of a variety of information, but preferably the notification signal contains information specific to the first system (i.e., identifies the user and any license information specific to that user), identifies the application or hardware in which the error occurred, and identifies the executed program command in which the error occurred. In addition, the notification signal can also include a copy of the executed program command in which the error occurred.

Further information regarding the error can include a predetermined number of executed program commands that occurred prior to the program command being executed when the error occurred. In many applications, executed commands are stored in a memory device following execution. Thus, a number of commands executed prior to the error signal may be easily retrieved. Alternatively, it is possible to identify which of the previously executed commands are related to the program command being executed when the error occurred. In this way, the likely sources of errors can be included regardless of their temporal relationship to the program command in which the error occurred.

After generating the notification signal at step 224, the notification signal is transmitted to the second system 127 at step 226 using the address retrieved from the second look-up table. Transmission of the notification signal can occur via any mode of system-to-system communication, such as via modem and telephone lines, wireless communication system (s), or electronic mail message via an Internet connection. It is also well within the scope of the present invention to adapt the present invention to include transmission of the notification signal to the second system using other modes of system-to-system communication hereafter developed.

Figure 5:
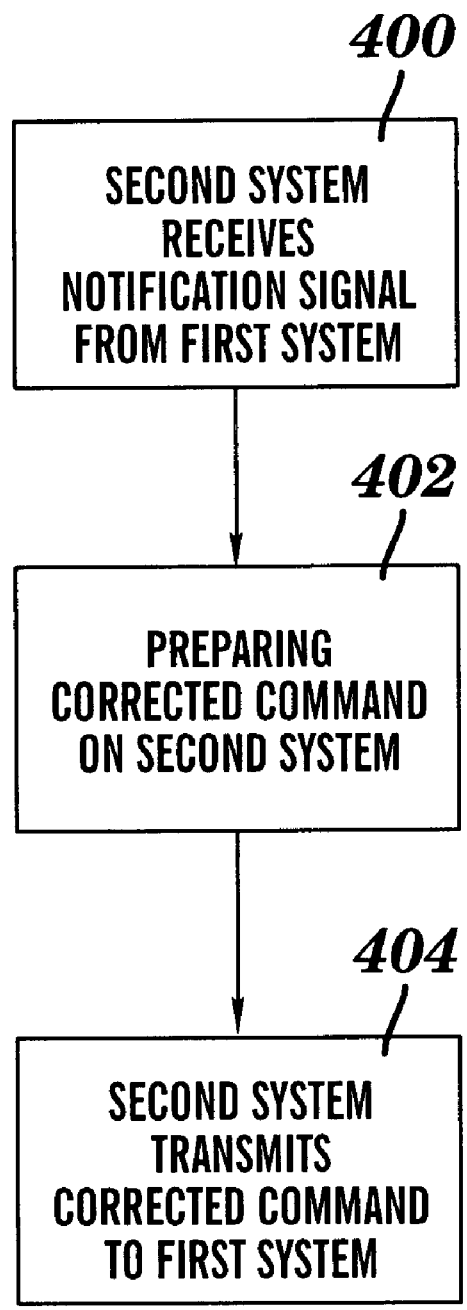
FIG. 5 is a flowchart of a method of resolving an error in accordance with an embodiment of the present invention.

The method and system of the present invention can optionally include further steps which enable resolution of the detected error in the executed program command. As shown in FIG. 5, the following steps occur on the second system 27 or 127. After the second system 27 or 127 receives the notification signal at step 400, a vendor or other designated representative is responsible for trouble shooting the program command being executed when the error occurred. Given that the notification signal contains the above-described information, at step 402 the vendor can resolve the error by preparing at least one corrected command which is intended to correct and/or replace the program command being executed when the error occurred. Obviously, the at least one corrected command can be prepared by an individual or it can be prepared by a diagnostic program designed to trouble-shoot errors and issue corrected commands. Having prepared the at least one corrected command, at step 404 the vendor transmits the at least one corrected command (i.e., as a response signal) from the second system 27 or 127 to the system 10 or 110 of the present invention using any conventional or hereafter developed mode of system-to-system communication.

Referring again to FIG. 2, at step 228 the server 112 receives the at least one corrected command. At step 230, the at least one corrected command is implemented by server 112 into the first set of program commands, replacing the disabled program command. One approach for implementing the corrected command is performed according to the method disclosed in U.S. patent application Ser. No. 09/443, 586 to Olin and Pagano entitled "A Method and System For Loading Instructions Into An Executing Process," filed Nov. 19, 1999. This will automatically enable all functions which were dependent upon the disabled program command. One of ordinary skill in the art may recognize other equivalent approaches for implementing the corrected command. After the at least one corrected command has been implemented, server 112 can optionally generate a resolution signal at step 232 to a user of a workstation 124 that the problem has been resolved.

According to a second embodiment of the present invention, the method and system can optionally perform a sub-routine at step 214 for non-major errors. In response to the query at step 210, it is determined by the server 112 whether or not the error signal is listed in the first look-up table. If the answer is affirmative, then the YES path shown in FIG. 3 is followed as described above. If the answer is negative, then the error signal is not indicative of a major error and the NO branch is taken to step 214 where the sub-routine is performed as outlined by the flowchart in FIG. 4.

At step 300 within the sub-routine, the system stores the detected error in memory 116 along with information regarding the detected error, such as the date on which the error occurred. Associated with the storage event at step 300, processor 114 causes a counter to record each storage event for each particular program command error. The number of storage events are also stored in memory 116. At step 302, therefore, the server 112 increases a storage event number (N) by one. Next, at step 304, the server queries whether the value of N is less than a predetermined number of error events (X).

Figure 4:
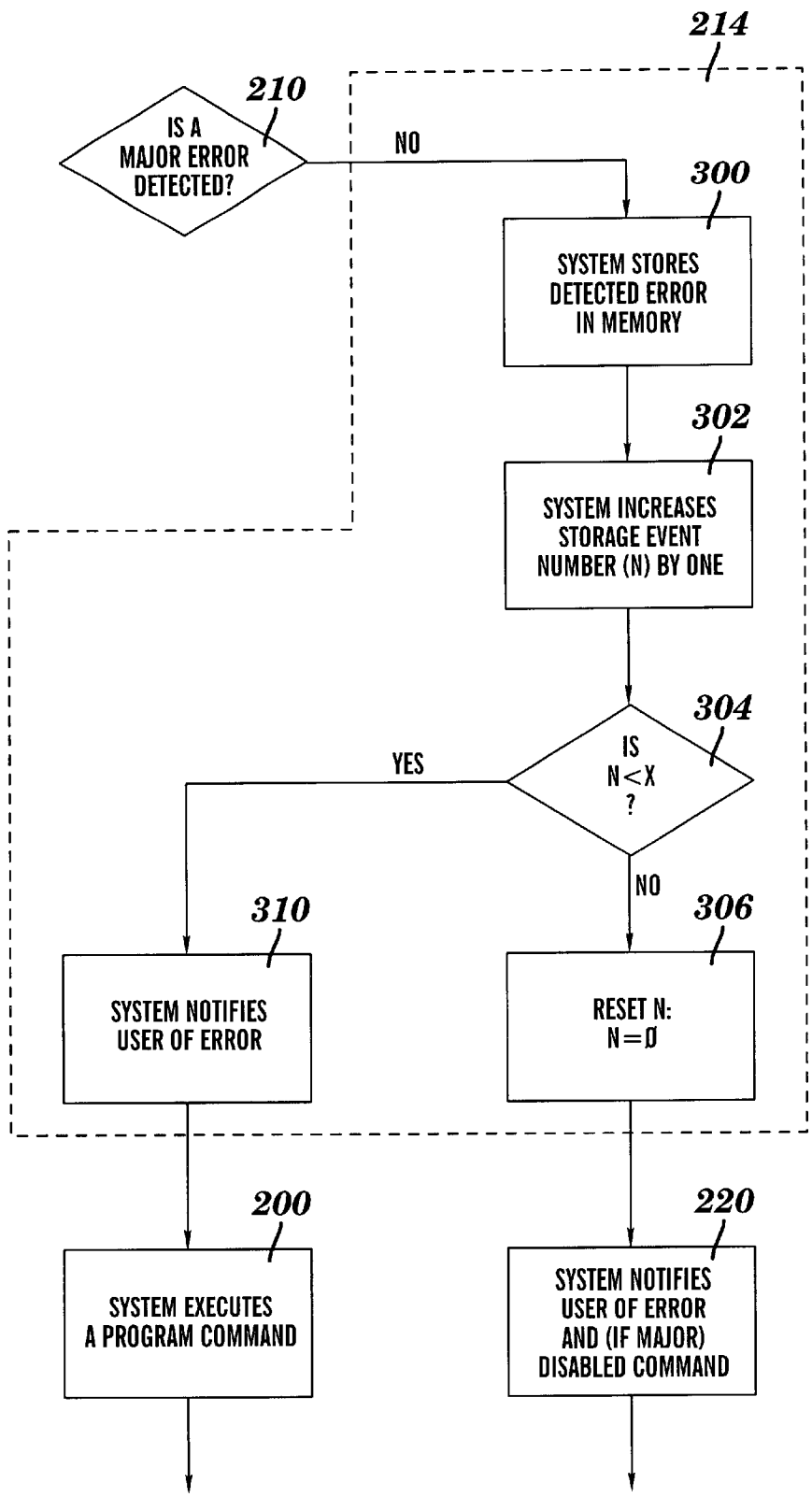

If N is less than X, then the YES pathway is followed to step 310. At step 310, the server notifies a user that an error occurred and that the event has been recorded. This is achieved by the processor 114 initiating a signal for a particular workstation 124, resulting in a message appearing on that workstation (i.e., on a monitor). This allows a user to re-enter an instruction and the method shown in FIGS. 3 and 4 is repeated when the server executes a program command at step 200.

If N is not less than X (i.e., N equals X), then the NO pathway is followed to step 306. At step 306, the server resets the storage event number to zero (i.e., N equals 0) and proceeds to step 220, which is when the user is notified of the error, as described above. The server then identifies the second system, generates the notification signal, and transmits the notification signal as described above. The notification signal preferably includes, along with previously described information, the information stored for each event at step 300.

Although the above description identified how the server 112 can execute the method of the present invention, it should be readily apparent to one of ordinary skill in the art that the system of the present invention can either be a single personal computer 12 or a network which includes a server 112 and a plurality of workstations 124, both of which are described above.

Having thus described the basic concept of the invention, it will be rather apparent to those of ordinary skill in the art that the foregoing detailed disclosure is intended to be presented by way of example only, and is not limiting. Various alterations, improvements, and modifications will occur and are intended to be performed by those of ordinary skill in the art, though not expressly stated herein. These alterations, improvements, and modifications are intended to be suggested hereby, and are within the spirit and the scope of the invention. Accordingly, the invention is limited only by the following claims and equivalents thereto.

What is claimed:

1. A method of providing external notification of an error comprising:

detecting an error during an execution of a program command in a first set of commands in a first system;

identifying in the first system one of a plurality of second systems to notify when the error is detected based on the first set of commands being executed;

generating a notification signal based on the detected error; and transmitting the notification signal to the identified second system.

2. The method according to claim 1 further comprising disabling the program command of the first set being executed when the error was detected.

3. The method according to claim 2 further comprising:
receiving at least one corrected command from the second system in response to the notification signal; and
implementing the at least one corrected command into the program commands of the first set in the first system.

4. The method according to claim 3 further comprising issuing a resolution signal in the first system after said implementing.

5. The method according to claim 1 wherein the notification signal further comprises the program command being executed when the error occurred.

6. The method according to claim 5 further comprising identifying a first number of the program commands executed prior to the program command being executed when the error occurred, the notification signal further comprising the first number of the program commands.

7. The method according to claim 1 further comprising storing the detected error, wherein said generating is carried out when a first number of the detected errors for the same executed program have been stored.

8. A method of resolving an error comprising:
detecting an error during an execution of a program command in a first set of commands in a first system;
identifying in the first system one of a plurality of second systems to notify when the error is detected based on the first set of commands being executed;
generating a notification signal based on the detected error;
transmitting the notification signal to the identified second system;
receiving at least one corrected command from the identified second system in response to the notification signal; and
implementing the at least one corrected command into the first set in the first system.

9. The method according to claim 8 further comprising disabling the program command of the first set being executed when the error was detected.

10. The method according to claim 8 further comprising issuing a resolution signal in the first system after said implementing.

11. The method according to claim 8 wherein the notification signal further comprises the program command being executed when the error occurred.

12. The method according to claim 11 further comprising identifying a first number of the program commands executed prior to the program command being executed when the error occurred, the notification signal further comprising the first number of the program commands.

13. The method according to claim 11 further comprising storing the detected error, wherein said generating is carried out when a first number of the detected errors for the same executed program have been stored.

14. A system comprising:
a detector configured to detect an error during an execution of a program command in one of a plurality of sets of commands;
a memory having stored therein an address for each of a plurality of systems and each of the plurality of sets of commands are associated with one of the plurality of systems;
a generator configured to generate a notification signal to one of the plurality of systems based on the one of the plurality of sets of commands in which the detected error is found; and
a transmitter configured to transmit the notification signal to the to the one of the plurality of systems associated with the one of the plurality of sets of commands in which the detected error is found.

15. The system according to claim 14, wherein the transmitter is a modem coupled to a phone line or wireless communication system, or an Internet connection.

16. The system according to claim 14, wherein the address is a telephone number or an electronic mail address.

17. A computer readable medium having stored thereon instructions which, when executed by a processor, cause the processor to perform the steps of:
detecting an error during an execution of a program command in a first set of commands in a first system;
identifying in the first system one of a plurality of second systems to notify when the error is detected based on the first set of commands being executed;
generating a notification signal based on the detected error; and
transmitting the notification signal to the identified second system.

18. The computer readable medium according to claim 17 wherein the computer readable medium has stored thereon further instructions which cause the processor to perform the step of disabling the program command of the first set being executed when the error was detected.

19. The computer readable medium according to claim 17 wherein the computer readable medium has stored thereon further instructions which cause the processor to perform the step of implementing into the program commands of the first set in the first system at least one corrected command received from the second system.

20. The computer readable medium according to claim 19 wherein the computer readable medium has stored thereon further instructions which cause the processor to perform the step of issuing a resolution signal in the first system after said implementing.

21. The computer readable medium according to claim 17 wherein the computer readable medium has stored thereon further instructions which cause the processor to perform the step of identifying a first number of the program commands executed prior to the program command being executed when the error occurred, the notification signal further comprising the first number of the program commands.

22. The computer readable medium according to claim 17 wherein the computer readable medium has stored thereon further instructions which cause the processor to perform the step of storing the detected error, wherein said generating is carried out when a first number of the detected errors for the same executed program have been stored.

* * * * *